(12) United States Patent
Laimböck

(10) Patent No.: US 6,467,562 B2
(45) Date of Patent: Oct. 22, 2002

(54) DRIVE UNIT FOR A MOTORCYCLE

(75) Inventor: Franz Laimböck, Thal (AT)

(73) Assignee: AVL List GmbH, Graz (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/455,812

(22) Filed: Dec. 7, 1999

(65) Prior Publication Data

US 2002/0053478 A1 May 9, 2002

(30) Foreign Application Priority Data

Jun. 17, 1999 (AT) .............................. 422/99 U

(51) Int. Cl.[7] .............................. B62D 61/02
(52) U.S. Cl. .................... 180/219; 123/54.4
(58) Field of Search ................ 180/219, 230, 180/227, 218; 123/54.4, 54.1, 193.1, 193.3, 196 CP, 195 R, 195 HC, 195 AC; 74/606 R, 640

(56) References Cited

U.S. PATENT DOCUMENTS

| | | | | | |
|---|---|---|---|---|---|
| 962,254 | A | * | 6/1910 | Rockwell | 123/54.4 |
| 1,510,937 | A | * | 10/1924 | Harley et al. | 180/219 |
| 4,226,296 | A | * | 10/1980 | Higaki | 180/219 |
| 4,339,964 | A | * | 7/1982 | Isaka | 180/219 X |
| 4,427,088 | A | * | 1/1984 | Tsuboi | 180/219 |
| 4,497,293 | A | * | 2/1985 | Takagi et al. | 180/219 |
| 4,637,354 | A | * | 1/1987 | Tominaga et al. | 180/219 |
| 4,903,483 | A | * | 2/1990 | Atsuumi et al. | 180/219 X |
| 4,920,825 | A | * | 5/1990 | Okazaki et al. | 123/195 C |
| 5,085,054 | A | * | 2/1992 | Katsuda et al. | 60/517 |
| 5,513,601 | A | * | 5/1996 | Benson | 123/54.4 |
| 5,560,446 | A | * | 10/1996 | Onishi | 180/219 |
| 5,937,817 | A | * | 8/1999 | Schanz et al. | 123/196 AB |

* cited by examiner

Primary Examiner—F. Zeender
(74) Attorney, Agent, or Firm—Dykema Gossett PLLC

(57) ABSTRACT

A drive unit for a motorcycle includes an internal combustion engine with at least two cylinders arranged in V-position, a clutch and a transmission, the transmission being located in the space between the cylinders.

14 Claims, 4 Drawing Sheets

DRIVE UNIT FOR A MOTORCYCLE

BACKGROUND OF THE INVENTION

This invention relates to a drive unit for a motorcycle that includes an internal combustion engine having at least two cylinders arranged in a V-configuration, a clutch and a transmission, i.e. a gear box.

The V-type arrangement of cylinders in motorcycle engines has a number of advantages which have led to the widespread use of such engine layouts. In the instance of two-cylinder engines the small overall width obtained with this arrangement will permit large banking angles of the motorcycle even with low-lying engines.

On the other hand, such a cylinder arrangement will increase the overall length of the drive unit, which will have its disadvantages, especially in the instance of large-displacement engines with a V-angle of 90°. It has been found moreover that in the instance of relatively short rear wheel swing arms, the quality of ride and handling will undergo a considerable change when the rear wheel oscillates, thus affecting driving stability.

SUMMARY OF THE INVENTION

It is an object of the present invention to avoid these disadvantages and to further develop a drive unit of the above described type such that the available space will be fully utilized whilst an advantageous rear axle geometry is achieved.

According to the invention the transmission is disposed in the space between the cylinders. Since this will permit the transmission to be accommodated within the space taken up by the engine at any rate, a particularly compact configuration of the drive unit will be obtained.

Preferably, a gear is provided on the crankshaft of the engine which meshes with a gear connected to a main gearshaft via the clutch. The primary drive is thus effected by a pair of gears. This solution is facilitated by the close vicinity of main gearshaft and crankshaft due to the layout proposed by the invention.

In a preferred solution the engine is provided with camshafts which are driven by gears in mesh with the gear on the main gearshaft. This gear whose outer contour extends into the region of the cylinder heads, is particularly well suited for driving the camshaft. In general, one intermediate shaft carrying two gears will suffice to bridge the distance to the camshaft axis on the one hand and provide the required transmission ratio on the other hand.

Special preference is given to a variant of the invention which provides that both a transmission output shaft carrying a sprocket for the rear wheel drive, and the bearing for the rear wheel swing arm be positioned in the space between the cylinders. In addition to the compact arrangement of components this variant will offer the advantage of a comparatively long rear wheel swing arm. As a consequence, the geometry of the chassis will change only slightly when the rear wheel oscillates and the quality of ride and handling will be upheld.

Preferably, the axle of the sprocket is situated higher than the axle of the rear wheel such that the rear wheel swing arm will drop at an angle of about 10° without load. Under normal load the rear wheel swing arm will thus drop slightly, whilst it will be level or slightly raised in the compressed state.

A further advantage is obtained if engine crankshaft, main gearshaft and transmission output shaft are positioned in a common plane. In particular, this will permit engine block and transmission housing to be split in the common plane. From the point of view of strength, such horizontal splitting is desirable in high-performace engines as no vertical splitting will be necessary in this case. The common plane will subtend an approximately equal angle with both cylinder axes in most instances, deviations being possible depending on the configuration of the transmission.

In an alternative version of the invention engine block and transmission housing are provided as an integral part. This variant will offer greater liberty in designing the transmission, as the countershaft need not be positioned in the same plane as crankshaft and main gearshaft.

A compact design is also achieved by providing the clutch outside of a cover plane of the engine. In this manner the diameter of the clutch will not be constrained by the cylinder arrangement.

In arranging the engine components more space may be saved by providing that the cylinders have a V-angle of 75° to 105° approximately. Angles of about 90° will offer sufficient space to accommodate the transmission as well as a satisfactory balancing of masses.

The present invention further relates to a motorcycle with a drive unit of the above type, wherein one cylinder is essentially horizontal and another cylinder is essentially vertical, the horizontal cylinder preferably being oriented against the direction of travel. In this manner the wheelbase may be kept particularly short.

Oil drainage from the horizontal cylinder is enhanced by providing that the axis of the horizontal cylinder have an inclination angle $\alpha$ of about 5° to 15° relative to the horizontal plane, rising towards the cylinder head.

Oil consumption and friction losses can be reduced by providing an oil scraper configured as a baffle plate in the engine crankcase, which plate will largely cover the opening into the horizontal cylinder. In this way the oil flow from the crankshaft drive into the cylinder will be minimized.

Ride and handling of the vehicle may be improved by positioning the axle of the sprocket higher than the axle of the rear wheel such that the rear wheel swing arm will drop at an angle of about 10° against the horizontal in the unloaded state.

DESCRIPTION OF THE DRAWINGS

Following is a more detailed description of the invention as illustrated by the accompanying drawings, in which.

DESCRIPTION OF PREFERRED EMBODIMENTS

Figure 1:
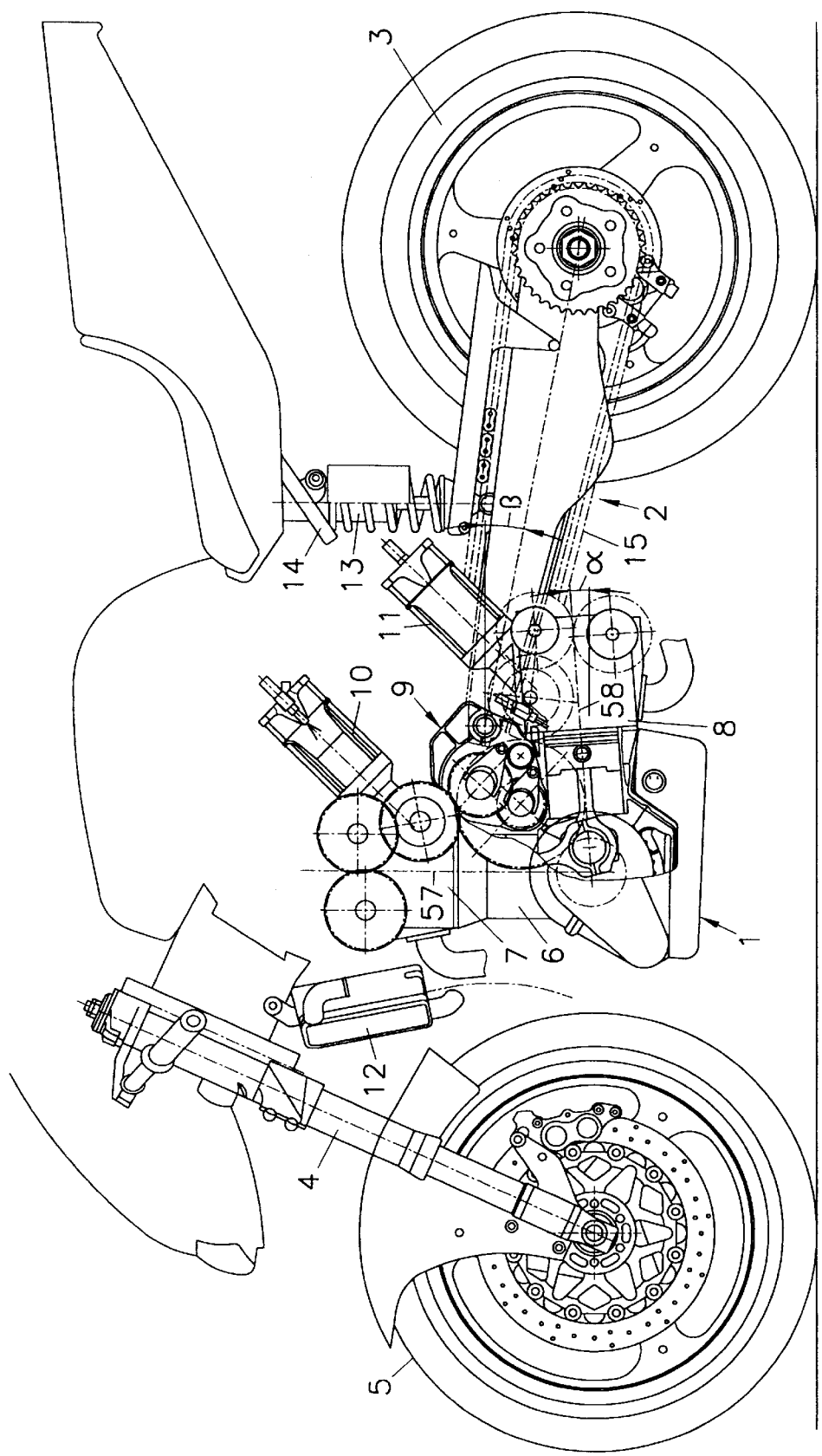
FIG. 1 is a schematic side view of a motorcycle with a drive unit according to the invention.

The motorcycle of FIG. 1 has a drive unit 1, a rear wheel swing arm 2 to which a rear wheel 3 is attached, and a front fork 4 with a front wheel 5. The drive unit 1 includes an internal combustion engine 6 with two cylinders 7 and 8 arranged in a Vee, a clutch (not shown in FIG. 1), and a transmission 9.

The axes 57, 58 of the two cylinders 7, 8 of the engine 6 are set at a V-shaped angle of 90° to each other, cylinder 7 being mounted upright in substantially vertical position, whereas cylinder 8 is oriented opposite the direction of travel, its axis 58 rising at an angle α of about 10° relative to the horizontal plane. The cylinders 7, 8 are supplied with charge from intake pipes 10, 11. In addition, a radiator 12 is provided.

A strut 13 supporting the rear wheel swing arm 2 is hinged on the frame 14 only roughly outlined in this drawing. The drive chain indicated by broken lines bears the reference 15.

Figure 2:
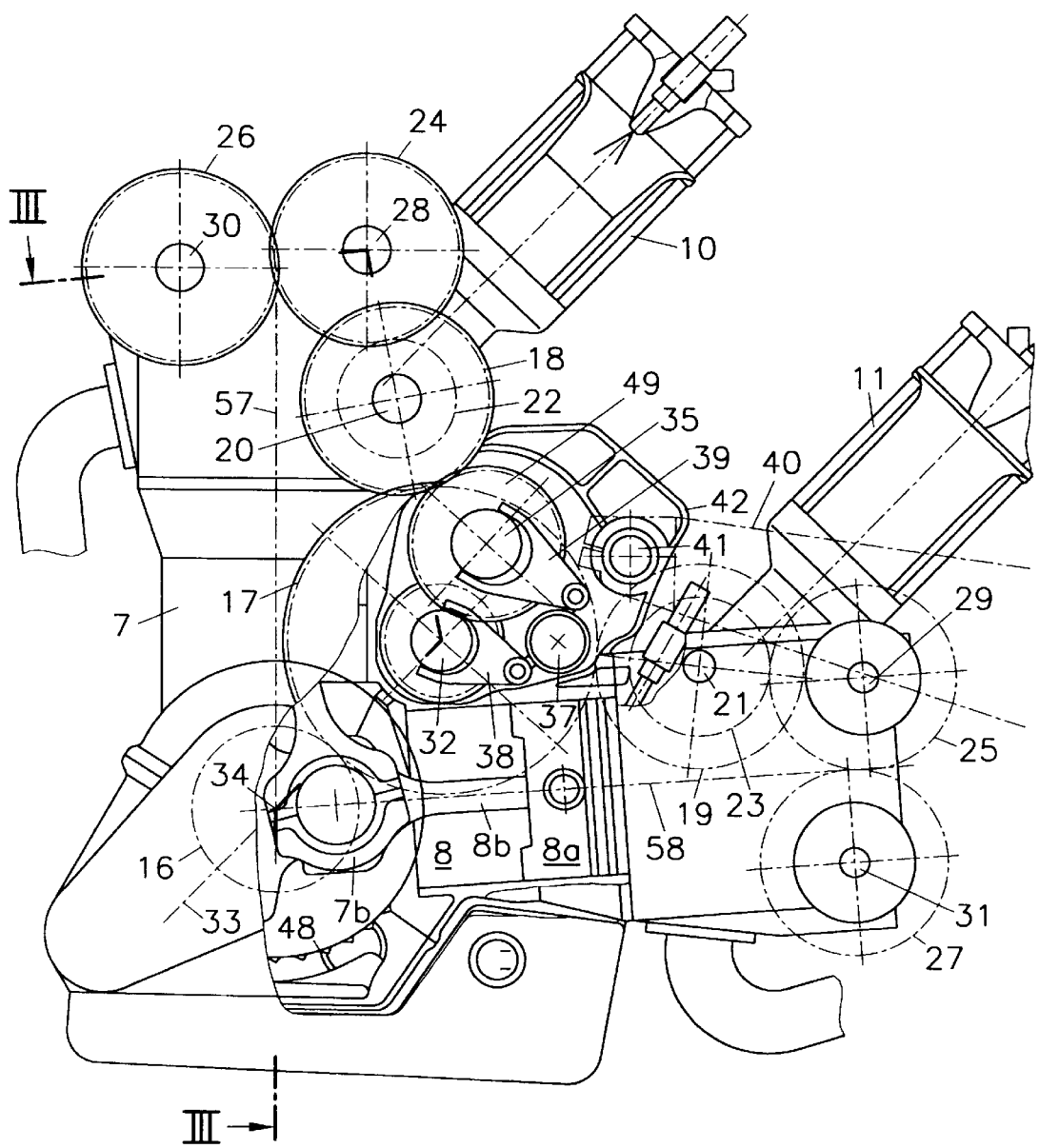
FIG. 2 is a longitudinal section of a first variant of the invention, a portion being broken away.

FIG. 2 shows the drive unit 1 of the motorcycle of FIG. 1 at an enlarged scale and in more detail. In the exposed cylinder 8 the corresponding piston 8a and its connecting rod 8b are seen. The connecting rod 7b of cylinder 7 is partially shown. The dash-dotted lines refer to a gear 16 which is fixedly attached to the engine crankshaft (not shown here in detail). The gear 16 meshes with another gear 17 connected to the clutch. In mesh with gear 17 are intermediate gears 18 and 19, which are positioned on a common shaft, i.e., 20 and 21, respectively, together with drive gears 22 and 23, respectively, which in turn mesh with first camshaft drive gears 24, 25. Together with further camshaft drive gears 26, 27 in mesh with gears 24, 25, the two camshafts 28, 30 and 29, 31 of cylinders 7 and 8, respectively, are driven.

The gear 17 is coaxial with the main gearshaft 32, which latter lies in a plane 33 which subtends equal angles with axes 57, 58 of cylinders 7, 8 and contains the crankshaft axis 34. The transmission output shaft 35, which is also referred to as countershaft, bears the sprocket 49 for the drive chain 15 (not shown in FIG. 2). A shifter shaft 37 cooperates with shifter forks 38, 39 (schematically drawn) to operate the transmission 9. The schematically drawn rear wheel swing arm 40 is hinged on the transmission housing 42 by means of a hinge bearing 41. Transmission housing 42 and engine block are configured as an integral unit in this variant, which will result in a particularly compact and stiff construction. Moreover, the distance between the hinge bearing 41 and the axle of the sprocket 49 can be kept small. Without load the rear wheel swing arm 40 will drop towards the rear wheel 3 at an angle β of about 10°.

Figure 3:
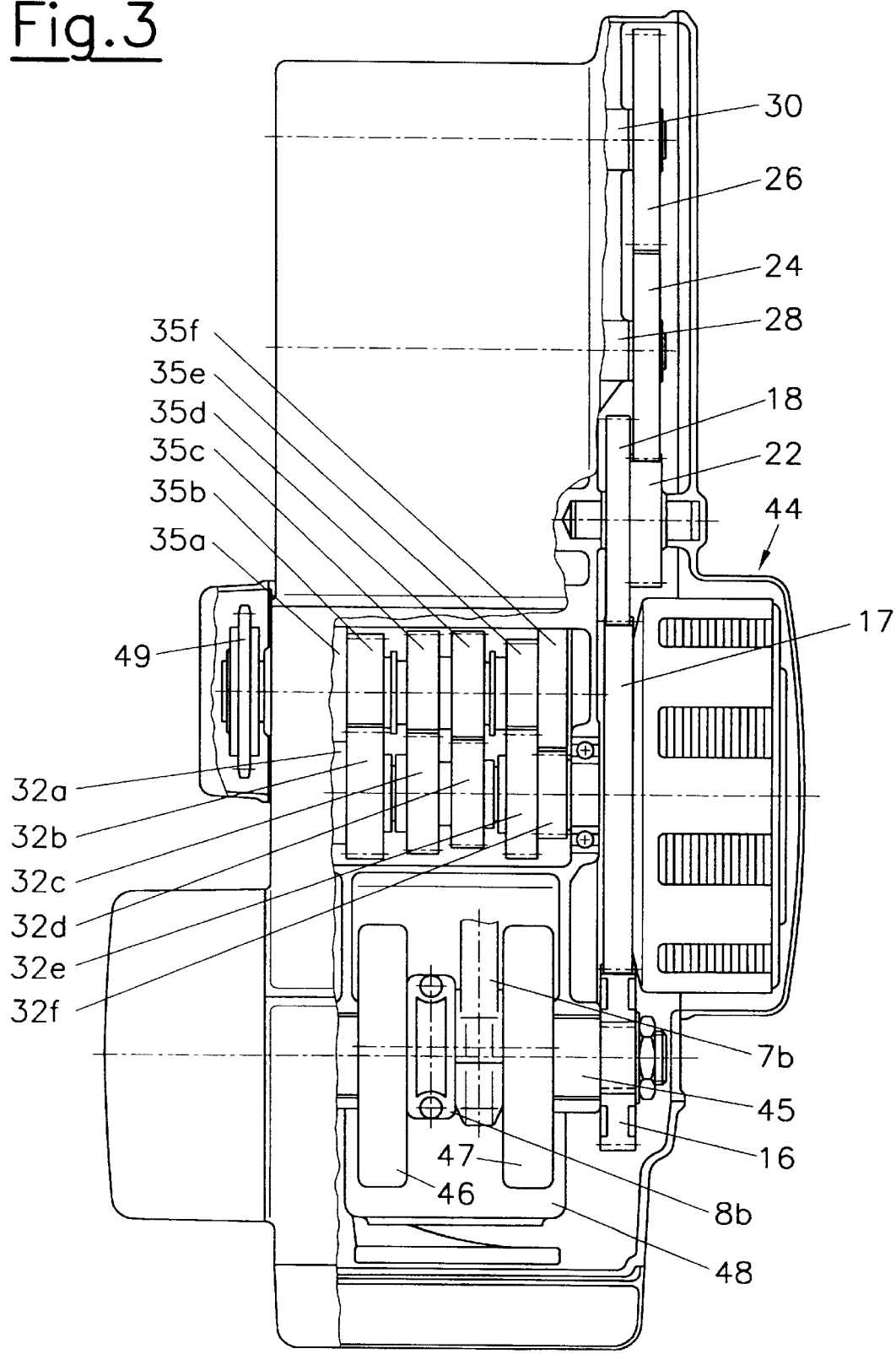
FIG. 3 is a section along line III—III in FIG. 2.

In FIG. 3 the position of the clutch 44 can be seen clearly. As the clutch 44, which is configured as a multi-plate clutch, is located beside the engine, the diameter of the clutch 44 is not constrained by the space available between the cylinders 7, 8. FIG. 3 further shows the crankshaft 45 with counterweights 46, 47 and connecting rods 7b, 8b. An oil scraper 48 configured as a baffle plate is designed to largely prevent oil from flowing into the horizontal cylinder 8.

FIG. 3 also shows the individual gear pairs 32a, 35a; 32b, 35b; 32c, 35c; 32d, 35d; 32e, 35e; 32f, 35f on shafts 32 and 35, respectively. A sprocket 49 is provided for driving a drive chain 15 (not shown in FIG. 3).

Figure 4:
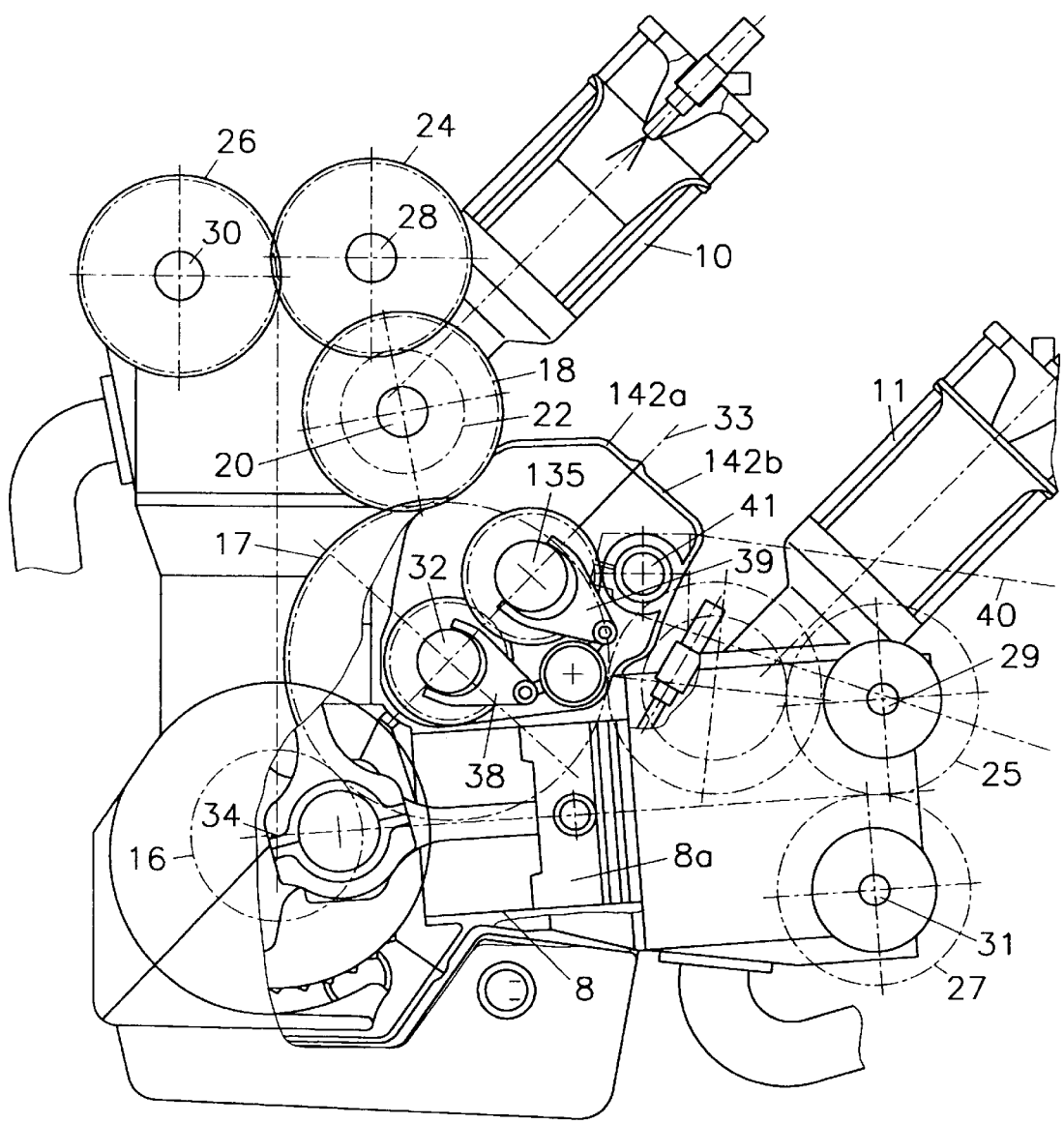
FIG. 4 is a section of a further variant of the invention corresponding to FIG. 2.

The variant shown in FIG. 4 largely corresponds to the variant described above. Analogous parts bear the same reference numbers as above. Following will be a discussion of the differences between the two variants. In the variant of FIG. 4 engine block and transmission housing are made up of two components 142a and 142b, which are joined along the common plane 33 containing the crankshaft axis 34, the axes of the main gearshaft 32 and the countershaft 135. With this variant too a short axial distance will be obtained between the bearing 41 of the rear wheel swing arm 40 and the countershaft 135.

The present invention will permit a design combining extremely compact dimensions and a stable structure. In particular, the drive unit will feature a short overall length whilst a long rear wheel swing arm will improve ride and handling characteristics.

What is claimed is:

1. A motorcycle which includes a front wheel at a front end and a rear wheel at a rear end and a drive unit in the form of an internal combustion engine, a clutch and a transmission, said internal combustion engine including at least two cylinders arranged such that a first cylinder is oriented essentially vertically and a second cylinder is oriented essentially horizontally with a head thereof located closer to the rear wheel at the rear end of said motorcycle than a base thereof adjacent a crankshaft, said first and second cylinders defining an arcuate space therebetween, and wherein said transmission is located in said arcuate space and includes multiple pairs of interengagable gears.

2. A motorcycle as claimed in claim 1, including a crankshaft and a main gearshaft, and wherein a first gear is provided on the crankshaft which meshes with a second gear connected to the main gearshaft via the clutch.

3. A motorcycle as claimed in claim 1, wherein the engine includes camshafts, and including gears in mesh with a gear on a main gearshaft for driving said camshafts.

4. A motorcycle as claimed in claim 1, wherein both an output shaft of the transmission carrying a sprocket for a rear wheel drive, and a bearing for the rear wheel swing arm are positioned in the space between the cylinders.

5. A motorcycle as claimed in claim 1, including an engine crankshaft, a main gearshaft and a transmission output shaft, and wherein said crankshaft, said main gearshaft and said output shaft are arranged in a common plane.

6. A motorcycle as claimed in claim 5, including an engine block and transmission housing, and wherein said engine block and said transmission housing meet in the common plane.

7. A motorcycle as claimed in claim 1, including an engine block and a transmission housing, and wherein said engine block and said transmission housing are one piece.

8. A motorcycle as claimed in claim 1, wherein the cylinders of the engine are positioned at a V-angle of about 75° to 105°.

9. A motorcycle as claimed in claim 1, wherein the engine is supplied with a dry sump lubrication.

10. A motorcycle as claimed in claim 1, wherein an axis of the horizontal cylinder has an inclination angle of about 5° to 15° relative to a horizontal plane, rising towards a cylinder head.

11. A motorcycle as claimed in claim 1, including an engine crankcase, and wherein an oil scraper is provided in the engine crankcase which largely covers the opening into the horizontal cylinder.

12. A motorcycle as claimed in claim 4, wherein an axle of the sprocket is higher than an axle of a rear wheel, such that the rear wheel swing arm will drop at an angle of about 10° relative to the horizontal in an unloaded state.

13. A motorcycle as claimed in claim 1, including a front fork and a rear wheel swing arm, said front wheel being mounted on said front fork and said rear wheel being mounted on said rear wheel swing arm.

14. A motorcycle as claimed in claim 4, which said rear wheel drive comprises a drive chain wrapped around said sprocket and extending rearwardly to another sprocket connected to a hub of said rear wheel to drive said rear wheel.

* * * * *